Dec. 8, 1953     D. E. PHINNEY     2,661,889
THERMAL COFFEE CUP
Filed July 20, 1948
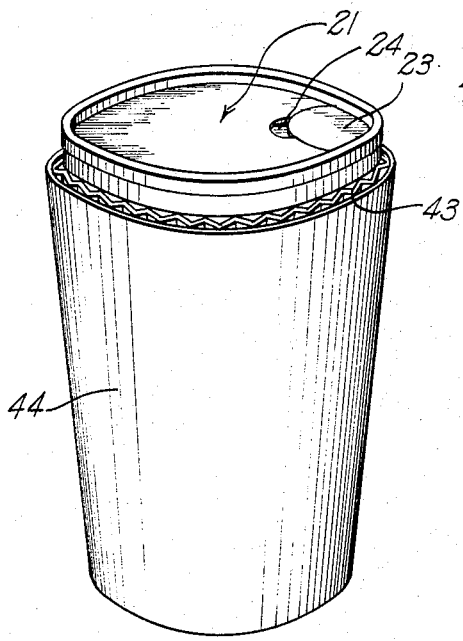
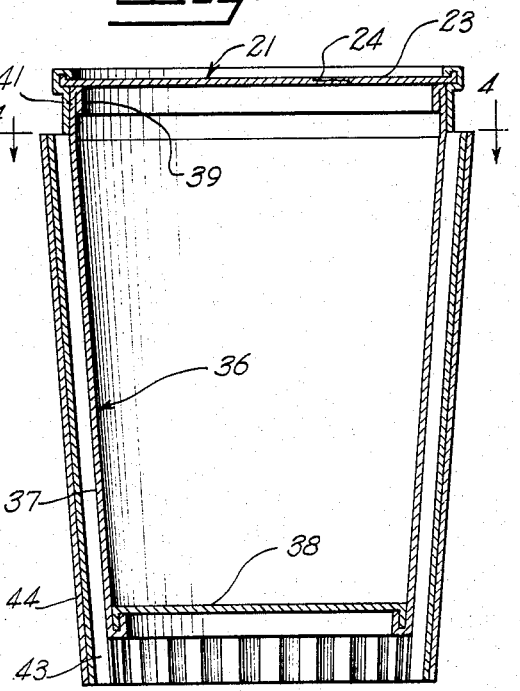
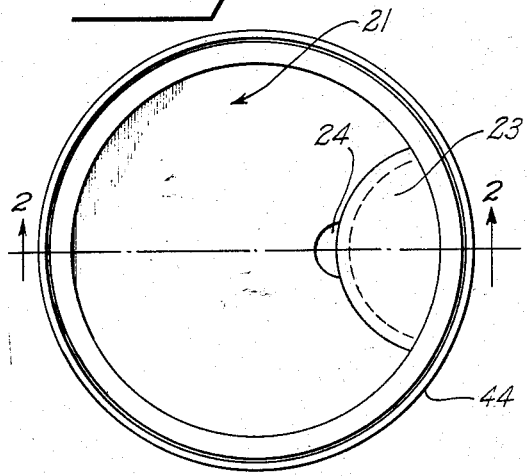
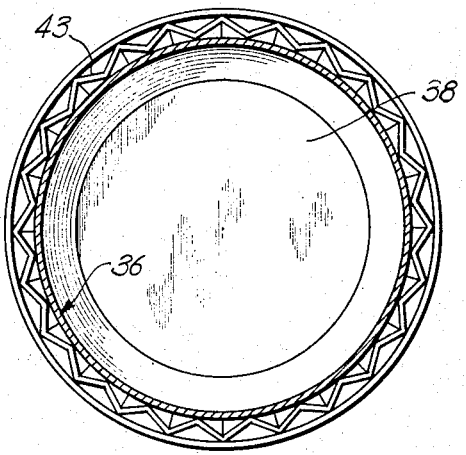
INVENTOR.
Delbert E. Phinney
BY *Victor J. Evans & Co.*
ATTORNEYS Patented Dec. 8, 1953

2,661,889

UNITED STATES PATENT OFFICE 2,661,889

THERMAL COFFEE CUP

Delbert E. Phinney, Sherman, Tex.

Application July 20, 1948, Serial No. 39,775

1 Claim. (Cl. 229—14)

This invention relates to a thermal coffee cup.

It is an object of the present invention to provide a container adapted to be held in the hand and adapted to receive a coffee cup which would normally be too hot to handle whereby the inner coffee cup will be insulated from the hand and to provide a cup arrangement particularly adapted for serving hot liquids such as coffee, tea, cocoa and so forth at public gatherings and to provide a container on which advertising matter may be disposed.

It is another object of the present invention to provide a cover cap for a paper coffee cup wherein a portion of the cap can be torn away to permit the drinking of the coffee or other hot liquids, the portion being broken away having a shape and being at the periphery of the cap so that the upper lip of the user of the cup can be extended into the opening whereby the cup can be used without the complete removal of the cap and whereby the contents of the cup can be kept covered and heated.

Other objects of the present invention are to provide a combined holder and coffee cup which is of simple construction, inexpensive to manufacture, easy to assemble, extended adequately at the top edge of the cup to provide access for the lips of the user, convenient to use and efficient in operation.

For other objects and for a better understanding of the invention, reference may be had to the following detailed description taken in connection with the accompanying drawing, in which Fig. 1 is a perspective view of the preferred embodiment of the invention wherein the holder is spaced from the cup by a corrugated lining.

Fig. 2 is a sectional view, in elevation, taken on line 2—2 of Fig. 3.

Fig. 3 is a top plan view of the form of the invention shown in Fig. 1.

Fig. 4 is a transverse sectional view taken on line 4—4 of Fig. 2.

Referring now particularly to the figures there is provided a cup 36 having a wall 37, a bottom 38 and an inwardly turned top edge 39. A ring extends about the top edge as indicated at 41 and this ring is rolled outwardly and then inwardly to provide a groove to receive and retain a cap 21. The cap 21 has a part 23 which can be broken away by extending a fingernail into a recess 24 of a main part 25 and beneath the edge of the part 23. The edges of the parts 23 and 25 are recessed for the connection of the parts together. When the part 23 is lifted, an opening suitable to receive the lips of the user of the cup is provided at the side of the cup. The main part 25 will remain in place whereby to keep the drink hot and keep the same from being splashed.

An insulating jacket is provided to receive a cup-like container and this jacket is provided with a corrugated lining 43 which is formed to receive the cup wall and this is retained by an outer sleeve 44. The upper and lower ends of the holder sleeve are open. The liner which is corrugated keeps the holder sleeve spaced from the top wall. The lining will abut at its upper end the bottom of the ring 41 and by virtue of the paper of the cup wall and the sleeve 44 both of which are frusto conical-shaped the cup is held against slippage through the sleeve and the lining. Access is had to the cup through the same part 23. The part being lifted from the main part of the cover.

It should now be apparent that there has been provided a cup holder for cups containing hot drinks whereby the fingers of the purchaser of the coffee or hot drink will not have his fingers over heated while using the cup. Advertising matter can be placed on the holder and the holder provided by parties other than the makers of the cups.

While various changes may be made in the detail construction, it shall be understood that such changes shall be within the spirit and scope of the present invention as defined by the appended claim.

I claim:

In an insulated container jacket, the combination which comprises an outer frusto conical-shaped sleeve and an inner corrugated lining having a plurality of open vertically disposed separated channels therein with both the upper and lower ends of said channels open, and with the inner surface of the lining also frusto conical-shaped, and a cup-like frusto conical-shaped container the upper and lower ends of which are rolled inwardly with a closure permanently secured in the lower end, an outer ring having a bead with a groove in the inner surface around the upper end of the container and a cap secured in the groove of said ring.

DELBERT E. PHINNEY.

References Cited in the file of this patent

UNITED STATES PATENTS

| Number | Name | Date |
|---|---|---|
| 885,887 | Taylor | Apr. 28, 1908 |
| 1,208,483 | Chesbrough | Dec. 12, 1916 |
| 1,497,159 | Porter | June 10, 1924 |
| 1,930,680 | Hinton | Oct. 17, 1933 |
| 1,966,270 | Trew | July 10, 1934 |
| 2,053,679 | Page | Sept. 8, 1936 |
| 2,144,948 | Wallace | Jan. 24, 1939 |
| 2,266,828 | Sykes | Dec. 23, 1941 |
| 2,329,512 | Clifford | Sept. 14, 1943 |
| 2,563,352 | Morse | Aug. 7, 1951 |

FOREIGN PATENTS

| Number | Country | Date |
|---|---|---|
| 145,172 | Germany | May 18, 1902 |